Nov. 29, 1955 G. L. HERSHMAN 2,725,072
BREAKAWAY COUPLING COVER
Filed June 22, 1953
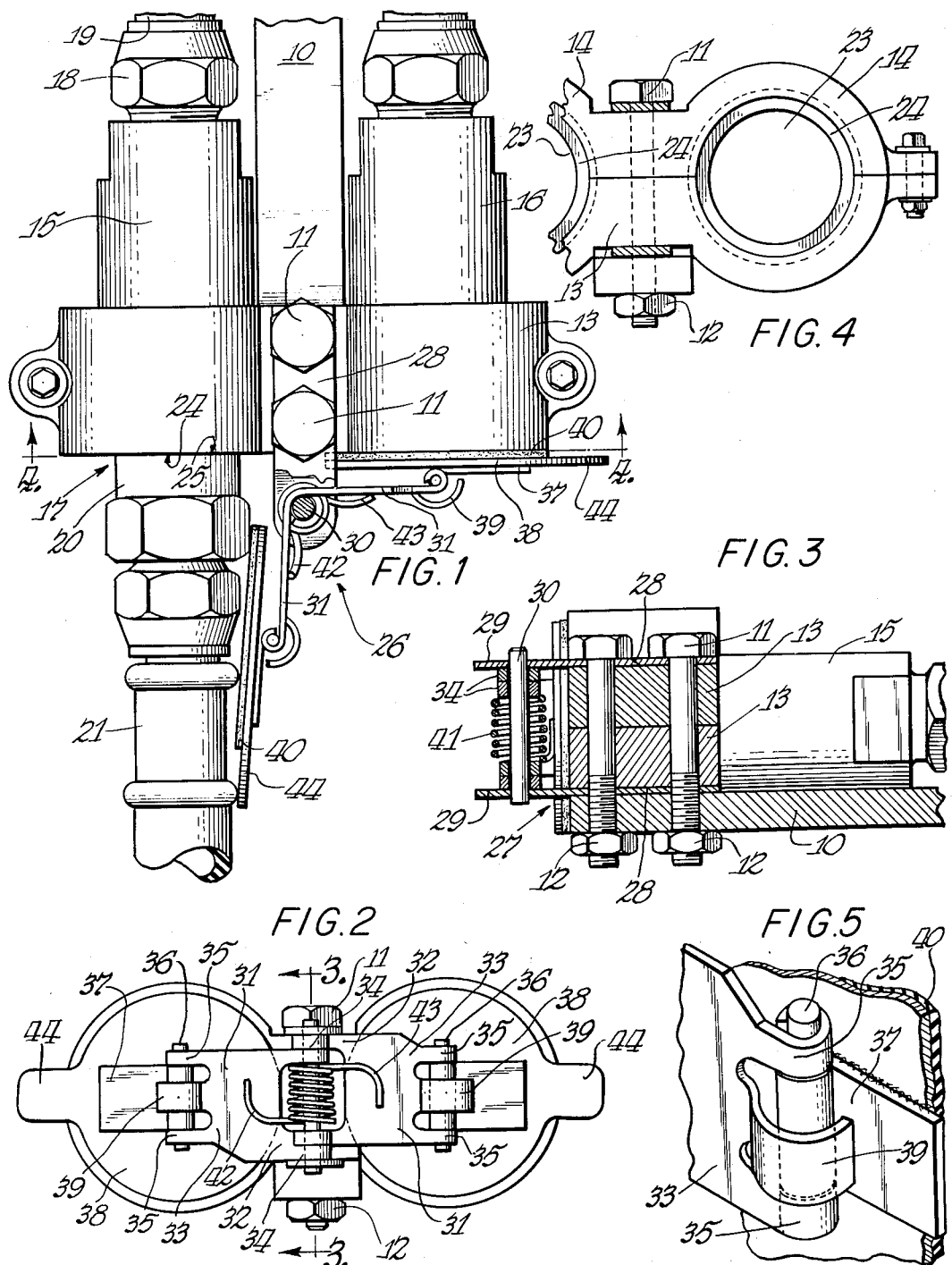
INVENTOR
GORDON L. HERSHMAN
Paul O. Pippel
ATTORNEY

United States Patent Office 2,725,072
Patented Nov. 29, 1955

2,725,072

BREAKAWAY COUPLING COVER

Gordon L. Hershman, Chicago, Ill., assignor to International Harvester Company, a corporation of New Jersey Application June 22, 1953, Serial No. 363,302

4 Claims. (Cl. 137—377)

This invention is concerned with an attachment for a self-sealing fluid conduit coupling of the type including two separable parts having relatively flat cooperating surfaces and alignable axial bores, and more particularly to a closure construction for covering the flat cooperating surface of a coupling part to prevent the entrance of dirt, dust, moisture, etc., in its bore and the accumulation of foreign matter on the cooperating surface thereof when the coupling part is disconnected from a mating coupling part.

Fluid, such as oil, under pressure is oftentimes used as a power transfer medium to operate tractor-drawn agricultural implements. The source of fluid pressure is usually associated with the tractor and is placed in fluid communication with the implement by a pair of flexible hoses or conduits. Inasmuch as it is frequently necessary to disconnect the source of fluid pressure from one implement and subsequently reconnect the source to the same implement or to a different implement, self-sealing fluid conduit couplings are generally interposed in the flexible conduits to permit connection and disconnection of the pressure source quickly and easily.

Each coupling usually includes two separable elements provided with axial bores having automatic sealing means therein which are mounted on the terminal portions of the implement and tractor conduits to be coupled and are adapted to transmit fluid when connected and to preclude the flow of fluid from the terminal portions of the conduits when disconnected. The elements associated with the tractor are customarily provided with relatively flat surfaces which are adapted to abut cooperating surfaces formed on the implement-carried coupling elements when the conduits are connected. Heretofore, when the conduits were disconnected the cooperating surfaces of the coupling elements carried by the tractor were exposed directly to the atmosphere and as a result dirt and other foreign matter accumulated thereon rendering the subsequent task of connecting the implement-carried coupling elements thereto difficult. Furthermore, dirt, dust, moisture, etc., were deposited within the interiors of the axial bores causing the automatic sealing means disposed within the bores to function improperly. It is, therefore, the primary objective of the present invention to provide an attachment for fluid conduit couplings which includes a spring-pressed cover for each coupling element associated with tractor which is yieldably urged to an overlying position with respect to a cooperating surface of the coupling element when the elements are disconnected from mating implement-carried coupling elements to thereby protect the tractor-carried coupling element axial bores against the entrance of dirt, dust, etc., and prevent the accumulation of foreign matter on the cooperating surfaces thereof and yet which is readily opened to permit the connection of mating coupling elements.

A further object is the provision of a pair of covers pivotally supported between a pair of contiguously arranged fluid conduit coupling elements which are adapted to swing between a closed position wherein the end faces of the elements are covered and an open position wherein mating coupling elements may be attached to the contiguous arranged elements without interference by the covers.

The foregoing and other important objects and desirable features inherent in and encompassed by the invention together with many of the purposes and uses thereof, will become readily apparent from a reading of the ensuing description in conjunction with the annexed drawings, in which, Figure 1 is a plan view of the invention;

Figure 2 is an end elevational view of the covers in their closed positions;

Figure 3 is a cross sectional view taken substantially along line 3—3 of Figure 2;

Figure 4 is a fragmentary end view taken substantially along line 4—4 of Figure 1; and Figure 5 is an enlarged, detailed view of the pivotal connection between a cover and a link.

Referring to the drawings, wherein like reference characters represent like elements throughout the various views, there is shown a portion of a supporting bar 10 which is rigidly attached to a tractor (not shown). Secured to the extreme end of the bar 10, by means of a pair of bolts 11 and nuts 12, and a pair of double C-shaped clamping members 13 which, when assembled on the bar 10, form a pair of sleeve-like sections 14, as best shown in Figure 4.

Extending through each sleeve-like section 14 is a tubular coupling element 15, 16 of a conventional self-sealing fluid conduit coupling 17. The elements 15, 16 are releasably secured to the supporting bar 10 by clamping the mating sections 14 together tightly. Inasmuch as the coupling elements 15, 16 shown are substantially identical in construction only the coupling element 15 shown on the left side of the bar 10, as viewed in Figure 1, will be referred to. The terminal portion 18 of a flexible hose or conduit 19 is connected to the coupling element 15. The hose 19, in turn, is in fluid communication with a source of fluid pressure such as a pump (not shown) carried by the tractor. In addition to the element 15, the coupling 17 includes a separable coupling element 20 which is adapted to be connected to the end portion 21 of a conduit 22 leading to a fluid pressure-operated implement (not shown). Although the details of construction of the coupling elements 15 and 20 are not shown or described since they form no part of the present invention, it is to be understood that each coupling element is provided with an axially extending, central bore 23 (shown in Figure 4 in elements 15, 16 only) in which is disposed valve means. The valve means are conditionable automatically to transmit fluid through the bores 23 when the elements 15 and 20 are coupled together, as shown in Figure 1. In the coupled state, the annular flat end face 24 encircling the end of the bore 23 formed in the coupling element 15 abuts a mating, cooperating end surface 25 provided on the implement-carried coupling element 20. Upon disconnection of the coupling elements 15 and 20, the valve means function to preclude the flow of fluid from the ends of the coupling elements.

It will be obvious that accumulation of dirt, dust, moisture, etc., on the mating surfaces 24 and 25 and in the bores 23 will impair the operation of the valve means. Heretofore, the end faces 24 and the bores 23 of the tractor-carried coupling elements 15 and 16 were exposed directly to the atmosphere and subjected to dirt, moisture, and other foreign elements when not coupled to cooperating implement-carried coupling elements and had to be thoroughly cleaned before the elements 15 and 16 could be connected to the implement-carried coupling elements. To obviate the necessity of cleaning the bores 23 and the surfaces 24 each time the coupling elements 15 are connected to cooperating coupling elements 20, an attachment, designated generally by numeral 26, is provided. The attachment 26 includes a bracket 27 which comprises a pair of vertically spaced, extensions 28 secured to the supporting bar 10 by means of bolts 11 and nuts 12. Portions 29 of the extensions 28 project beyond the flat end faces 24 of the coupling elements 15 and 16 and are adapted to support a vertically disposed pin 30. A pair of links 31, having bifurcated end portions 32, 33, each have one end pivotally connected to the pin 30. The arms 34 formed by the bifurcation are wrapped around the pin 30 to form the pivoted connection. The arms 35, formed by the opposite bifurcated portion 33, are similarly wrapped around vertically extending pins 36. Each pin 36 is secured to a metal strip 37 which, in turn, is welded to one side of a circular cover 38. Integrally formed with each link 31 and extending between the arms 35 is a curved lug 39, the purpose of which will be explained hereinafter.

Suitably secured to one side of each cover 38 is a circular pad 40 of rubber or like material having a diameter greater than the diameter of the coupling elements 15 and 16. The pads 40 are adapted to abut the annular end faces 24 of the elements 15 and 16 when the covers 38 are in their closed positions as shown in Figure 2. A coil spring 41 encircles the pin 30 and has its ends 42, 43 in engagement with respective links 31. The spring 41 yieldably urges the links 31 toward the end faces 24 of the coupling elements 15 and 16 causing the covers 38 to assume their closed positions wherein the faces 24 as well as the bores 23 are protected from the atmosphere. In order to connect a mating coupling element 20 to a coupling element 15 it is merely necessary to grasp the projection finger grip 44 of the cover 38 positioned over end of the element 15 or 16 and pivot the same away from engagement with the element 15 or 16 against the resilient action of the spring 41. Thereafter the mating coupling element 20 is advanced axially and connected to the coupling element 15 or 16. Upon release of the cover 38 it bears against the exterior of the coupling element 20 as shown in Figure 1. The curved lugs 39 are provided to limit the pivotal movement of the covers 38 with respect to their respective links 31 in one direction in order to facilitate opening of the covers by grasping the grip 44.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated that the particular structure and functional aspects emphasized herein are not intended to exclude, but rather to suggest, such adaptations and modifications of the invention as fall within the spirit and scope of the invention as defined by the appended claims.

What is claimed is:

1. The combination comprising, a pair of contiguously arranged, self-sealing fluid conduit coupling elements having axial bores, said elements being mountable on the terminal portions of a pair of conduits and being provided with flat end faces, said elements being further adapted to transmit fluid through said bores when connected to mating coupling elements and to preclude the flow of fluid when disconnected; a pair of substantially flat covers, each of said covers having a pad of resilient material secured to one surface thereof; means pivotally supporting said covers between said contiguously arranged elements, each of said covers being individually swingable between a closed position wherein said cover overlies, and the pad associated therewith abuts, the relatively flat end face of a respective contiguously arranged element when the mating coupling element associated therewith is disconnected therefrom and an open position wherein said cover is moved out of axial alignment with the bore of said associated element when the element and its mating coupling element are connected including a first pivot pin, a pair of links, each of said links having one end bifurcated to provide leg portions, said leg portions being pivotally connected to said first pivot pin, the pivotal axis of said links to said first pivot pin being axially spaced beyond the flat end faces of said conduits, a second pivot pin supported by each cover, each of said links having one end pivotally connected to a respective second pivot pin whereby each cover is capable of pivoting about its second pivot pin with respect to its associated link; a spring encircling said first pivot pin and disposed between the leg portions of said link for urging said covers to their closed positions and having each of its ends abutting a respective link; and a stop lug carried by each link for limiting the pivotal movement of the cover associated therewith in one direction about its respective second pivot pin.

2. The combination comprising a pair of contiguous coupling elements having axial bores arranged in a side by side relationship, said elements having relatively flat end faces disposed substantially in a common flat plane; a pair of substantially flat covers; means pivotally supporting said covers between said elements whereby each of said covers is individually swingable between a closed position wherein said cover overlies the end face of a respective element and an open position wherein said cover is moved out of axial alignment with the axial bore of said respective element including axially extending bracket means, a first pivot pin supported by said bracket means, a pair of links, each of said links having one end bifurcated to provide a pair of legs, said legs being pivotally connected to said first pivot pin, the pivotal axis of said links to said first pivot pin being axially spaced beyond the flat ends faces of said coupling elements, a second pivot pin supported by each cover, each of said links having one end pivotally connected to a respective pivot pin whereby each cover is capable of pivoting about its second pivot pin with respect to its associated link; a coiled spring encircling said first pivot pin and disposed between the legs of said links for urging said covers to their closed positions and having each of its ends abutting a respective link; and a stop lug carried by each link for engaging an associated cover for limiting the pivotal movement of the cover in one direction about its respective second pivot pin.

3. An attachment for a pair of self-sealing fluid conduit couplings of the type in which each coupling includes two separable elements having axial bores mounted respectively on the terminal portions of a pair of conduits to be coupled and are adapted to transmit fluid through the bores when connected and to preclude the flow of fluid when disconnected, one element of one coupling being contiguously arranged in a side by side relationship with an element of the other coupling whereby their respective bores are substantially parallel, said contiguously arranged elements having relatively flat end faces adapted to engage the end faces of the other of said elements when said conduits are coupled, comprising; a pair of substantially flat covers, each of said covers having a pad of resilient material secured to one surface thereof; means pivotally supporting said covers between said contiguously arranged elements, each of said covers being individually swingable between a closed position wherein said cover overlies, and the pad associated therewith abuts, the relatively flat end face of a respective contiguously arranged element when the conduits associated therewith are uncoupled and an open position wherein said pad lies against an exterior, axially extending surface of the other element of the coupling when said conduits are coupled including a first pivot pin, a pair of links, each of said links having a bifurcated end portion to provide a pair of legs, said legs being pivotally connected to said first pivot pin, the pivotal axis of said links and said first pivot pin being axially spaced beyond the flat end faces of said coupling elements, a second pivot pin supported by each cover, each of said links having one end pivotally connected to a respective second pivot pin whereby each cover is capable of pivoting about its second pivot pin with respect to its associated link, a spring encircling said first pivot pin and disposed between the legs of said links for urging said covers to their closed positions and having each of its ends abutting a respective link; and a stop lug carried by each link for limiting the pivotal movement of the cover associated therewith in one direction about its respective second pivot pin.

4. An attachment for a pair of contiguous coupling elements having axial bores arranged in a side by side relationship, said elements having relatively flat end faces disposed substantially in a common flat plane, comprising; a pair of substantially flat covers; means pivotally supporting said covers between said elements whereby each of said covers is individually swingable between a closed position wherein said cover overlies the end face of a respective element and open position wherein said cover is moved out of axial alignment with the axial bore of said respective element including axially extending bracket means, a first pivot pin supported by said bracket means, a pair of links, each of said links having a bifurcated end portion to provide a pair of legs, said legs being pivotally connected to said first pivot pin, the pivotal axis of said links and said first pivot pin being axially spaced beyond the flat end faces of said coupling elements, a second pivot pin supported by each cover, each of said links having one end pivotally connected to a respective pivot pin whereby each cover is capable of pivoting about its second pivot pin with respect to its associated link; a coiled spring encircling said first pivot pin and disposed between the legs of said links for urging said covers to their closed positions and having each of its ends abutting a respective link; and a stop lug carried by each link for engaging an associated cover for limiting the pivotal movement of the cover in one direction about its respective second pivot pin.

References Cited in the file of this patent
UNITED STATES PATENTS

| | | |
|---|---|---|
| 1,523,787 | Montano | Jan. 20, 1925 |
| 1,929,527 | Treverton | Oct. 10, 1933 |
| 2,084,842 | Fraser | June 22, 1937 |
| 2,630,131 | Snyder | Mar. 3, 1953 |
| 2,638,915 | Mitchell | May 19, 1953 |